United States Patent
Larsen

(10) Patent No.: US 9,478,785 B2
(45) Date of Patent: Oct. 25, 2016

(54) POLARITY PROTECTION FOR MULTIPLE BATTERIES

(75) Inventor: Glen C. Larsen, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 2053 days.

(21) Appl. No.: 11/796,265

(22) Filed: Apr. 27, 2007

(65) Prior Publication Data

US 2008/0268296 A1    Oct. 30, 2008

(51) Int. Cl.
*H01M 2/20*    (2006.01)
*H01M 2/34*    (2006.01)

(52) U.S. Cl.
CPC ............ *H01M 2/202* (2013.01); *H01M 2/204* (2013.01); *H01M 2/342* (2013.01)

(58) Field of Classification Search
CPC ..... H01M 2/202; H01M 2/204; H01M 2/342
USPC ................... 429/100, 99, 96, 152, 154, 158
See application file for complete search history.

(56) References Cited

U.S. PATENT DOCUMENTS

| | | |
|---|---|---|
| 3,930,889 A | 1/1976 | Ruggiero et al. ............ 136/166 |
| 3,984,257 A | 10/1976 | Zurcher |
| 3,997,903 A | 12/1976 | Kelch et al. |
| 4,084,037 A | 4/1978 | Morton ............................. 429/1 |
| 4,487,620 A | 12/1984 | Neusy |
| 4,578,628 A | 3/1986 | Siwiak |
| 4,595,641 A | 6/1986 | Giurtino ........................... 429/1 |
| 4,833,068 A | 5/1989 | Andoh et al. |
| 4,972,135 A | 11/1990 | Bates et al. ...................... 320/25 |
| 5,116,699 A | 5/1992 | Miyajima |
| 5,194,340 A | 3/1993 | Kosako ............................. 429/1 |
| 5,229,220 A | 7/1993 | Stanton et al. ................... 429/1 |

(Continued)

FOREIGN PATENT DOCUMENTS

| | | |
|---|---|---|
| JP | S48-019923 U | 3/1973 |
| JP | S50-059737 A | 5/1975 |

(Continued)

OTHER PUBLICATIONS

"DN78 ZXSC310 with reverse polarity protection", ZETEX Semiconductors, Issue 2—Jul. 2006, 6 pages, www.zetex.com.

(Continued)

*Primary Examiner* — Ula C Ruddock
*Assistant Examiner* — Thomas Parsons
(74) *Attorney, Agent, or Firm* — Qudus Olaniran; Judy Yee; Micky Minhas

(57) ABSTRACT

Battery carriages are provided herein that interface with batteries in the correct polarization, regardless of the orientation in which the batteries are inserted in the battery carriages. Such battery carriages may be advantageously used with any device that uses batteries. Such a device may include two or more battery carriages, wherein each of the battery carriages includes first and second dual-contact assemblies disposed on a substrate. Each of the two dual-contact assemblies may have a positive contact and a negative contact. The positive contacts may each be configured to contact a positive terminal of a battery and to be connected to a positive circuit connection, and the negative contacts may each be configured to contact a negative terminal of a battery and to be connected to a negative circuit connection.

4 Claims, 9 Drawing Sheets

(56) References Cited

U.S. PATENT DOCUMENTS

| | | | |
|---|---|---|---|
| 5,376,476 | A | 12/1994 | Eylon |
| 5,431,575 | A * | 7/1995 | Engira .......................... 439/500 |
| 5,623,550 | A | 4/1997 | Killion |
| 5,631,098 | A * | 5/1997 | Suzuki .............................. 429/1 |
| 5,736,273 | A * | 4/1998 | Lee ....................... H01M 2/342 429/1 |
| 5,827,619 | A * | 10/1998 | Iida ................................... 429/1 |
| 5,906,505 | A | 5/1999 | McCurdy, Jr. et al. ...... 439/500 |
| 5,909,102 | A | 6/1999 | Stone, III et al. |
| 5,962,159 | A | 10/1999 | Satou et al. |
| 6,001,504 | A | 12/1999 | Batson et al. |
| 6,023,146 | A | 2/2000 | Casale et al. |
| 6,062,901 | A * | 5/2000 | Liu et al. ...................... 439/500 |
| 6,238,818 | B1 * | 5/2001 | Dalton ............................ 429/96 |
| 6,291,970 | B1 | 9/2001 | Miller et al. .................. 320/112 |
| 6,338,914 | B1 | 1/2002 | Schuurmans |
| 6,345,464 | B1 | 2/2002 | Kim |
| 6,359,418 | B1 | 3/2002 | Regan et al. |
| 6,361,897 | B1 | 3/2002 | Snyder |
| 6,472,089 | B1 | 10/2002 | Stricker et al. ................... 429/1 |
| 6,783,390 | B2 | 8/2004 | Berg et al. .................... 439/500 |
| 7,527,893 | B2 | 5/2009 | Larsen |
| 2005/0123825 | A1 * | 6/2005 | Nakamura ....................... 429/99 |
| 2005/0283506 | A1 | 12/2005 | Kamibayashi |
| 2006/0028175 | A1 | 2/2006 | Tsiang |

FOREIGN PATENT DOCUMENTS

| | | |
|---|---|---|
| JP | S51-135330 | 11/1976 |
| JP | S53-052337 U | 5/1978 |
| JP | S56-32673 A | 4/1981 |
| JP | S56-113016 | 9/1981 |
| JP | S58-164178 U | 1/1983 |
| JP | S58-019461 U | 2/1983 |
| JP | S58-085760 U | 5/1983 |
| JP | S58-117106 U | 8/1983 |
| JP | S58-177106 | 10/1983 |
| JP | S59-003025 | 1/1984 |
| JP | S59-127364 A | 7/1984 |
| JP | S60-087162 U | 6/1985 |
| JP | S60-115452 U | 8/1985 |
| JP | S62-041261 | 2/1987 |
| JP | S63-149065 U | 2/1987 |
| JP | H01-130257 U | 9/1989 |
| JP | H05-006759 A | 1/1993 |
| JP | 11-16551 A | 1/1999 |
| JP | 2000-11976 A | 1/2000 |
| JP | 2003-100271 A | 4/2003 |
| JP | 2010506361 A | 2/2010 |
| JP | S46-62737 | 3/2011 |
| TW | 183558 B | 5/1992 |
| TW | 455887 B | 9/2001 |
| TW | 535312 B | 6/2003 |

OTHER PUBLICATIONS

Technical Paper, "Reverse Battery Protection Using PPTC Devices", Tyco Electronics Power Components, Anthony Cilluffo, Automotive Accounts Manager, www.tycopowercomponents.com , 2003.

"IOTA Power Converter/Charger" Owner's Manual, IOTA Engineering, L.L.C., www.iotaengineering.com , 2002.

International Search Report and Written Opinion of PCT/US2008/057522 filed Mar. 19, 2008.

International Search Report PCT/US2007/009912, dated Oct. 19, 2007.

"Reverse-Current Circuitry Protection", http://pdfserv.maxim-ic.com/en/an/AN636.pdf, dated Jan. 31, 2001.

"Battery Cavity Design", accessed on Nov. 9, 2010 through Wayback Machine (http://web.archive.org/web/20060421083224/http://www.duracell.com/procell/design/cavity.asp, dated in Wayback Machine Apr. 21, 2006).

"Design Ideas", http://www.edn.com/contents/images/122100di.pdf, dated Dec. 21, 2000.

Notice of Rejection dated Feb. 26, 2013 from the Japanese Patent Office for corresponding Japanese Patent Application No. 2010-056361.

Notice of Rejection from Japanese Application No. 2013-109674, dispatch date: Aug. 27, 2014. 8 pages.

"Notice of Allowance Received for Japan Patent Application No. 2010-506361", Mailed Date: Oct. 8, 2013, Filed Date: Mar. 19, 2008, 4 Pages.

"Office Action Received for Taiwan Patent Application No. 97110876", Mailed Date: Oct. 22, 2013, Filed Date; Mar. 26, 2008, 11 Pages.

"Office Action Issued in Japanese Patent Application No. 2013-109674", Mailed Date: May 7, 2015, 7 Pages.

"Notice of Allowance Issued in Taiwan Patent Application No. 97110876", Mailed Date: Aug. 1, 2014, 4 Pages.

Letters Patent for Taiwan Patent Application No. 97110876 dated Nov. 21, 2014, 2 pages.

Notice of Rejection for Japanese Patent Application No. 2010-506361 dated Jul. 1, 2013, 4 pages.

Notice of Allowance for Japanese Patent Application No. 2013-109674 dated Aug. 4, 2015, 3 pages.

Letters Patent for Japanese Patent Application No. 2010-506361 dated Nov. 15, 2013, 2 pages.

Extended European Search Report for European Application No. 08744074.9 dated Jun. 22, 2015, 5 pages.

Letters Patent for Japanese Patent Application No. 2013-109674 dated Sep. 11, 2015, 2 pages.

European Communication pursuant to Rules 70(2) and 70a(2) dated Jul. 9, 2015, 1 page.

\* cited by examiner

POLARITY PROTECTION FOR MULTIPLE BATTERIES

BACKGROUND

Batteries must typically each be installed in a proper orientation in the electrical devices or products that draw power from such batteries. Proper installation is commonly achieved through the use of written instructions and/or graphical directions on or in the product near or in the battery receiving area, such instructions or directions identifying the proper battery orientation for correct electrical polarity. Users often follow such instructions correctly, but at times the graphics may be difficult to see as they may have been molded directly into or as part of the product housings or the directions may have been printed on what may appear to be increasingly smaller labels. Additionally, it is inevitable that batteries are inserted incorrectly at times due simply to user error. As a result, battery problems and product damage may occur. When batteries are oriented with incorrect polarity within an electronic product, the best case may be that the product cannot properly draw power and simply does not work. In worse cases, batteries can overheat and/or leak corrosive acid, which can thereby cause permanent damage to the electronics, destroy the product, cause a fire or explosion, and/or pose a threat of injury to the user. The risks involved in batteries installed in improper orientations therefore presents a persistent and substantial problem.

The discussion above is merely provided for general background information and is not intended to be used as an aid in determining the scope of the claimed subject matter.

SUMMARY

Battery carriages are provided herein that interface with batteries in the correct polarization, regardless of the orientation in which the batteries are inserted in the battery carriages. Such battery carriages may be advantageously used with any device that uses batteries. Such a device may include two or more battery carriages, wherein each of the battery carriages includes first and second dual-contact assemblies disposed on a substrate. Each of the two dual-contact assemblies may have a positive contact and a negative contact. The positive contacts may each be configured to contact a positive terminal of a battery and to be connected to a positive circuit connection, and the negative contacts may each be configured to contact a negative terminal of a battery and to be connected to a negative circuit connection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
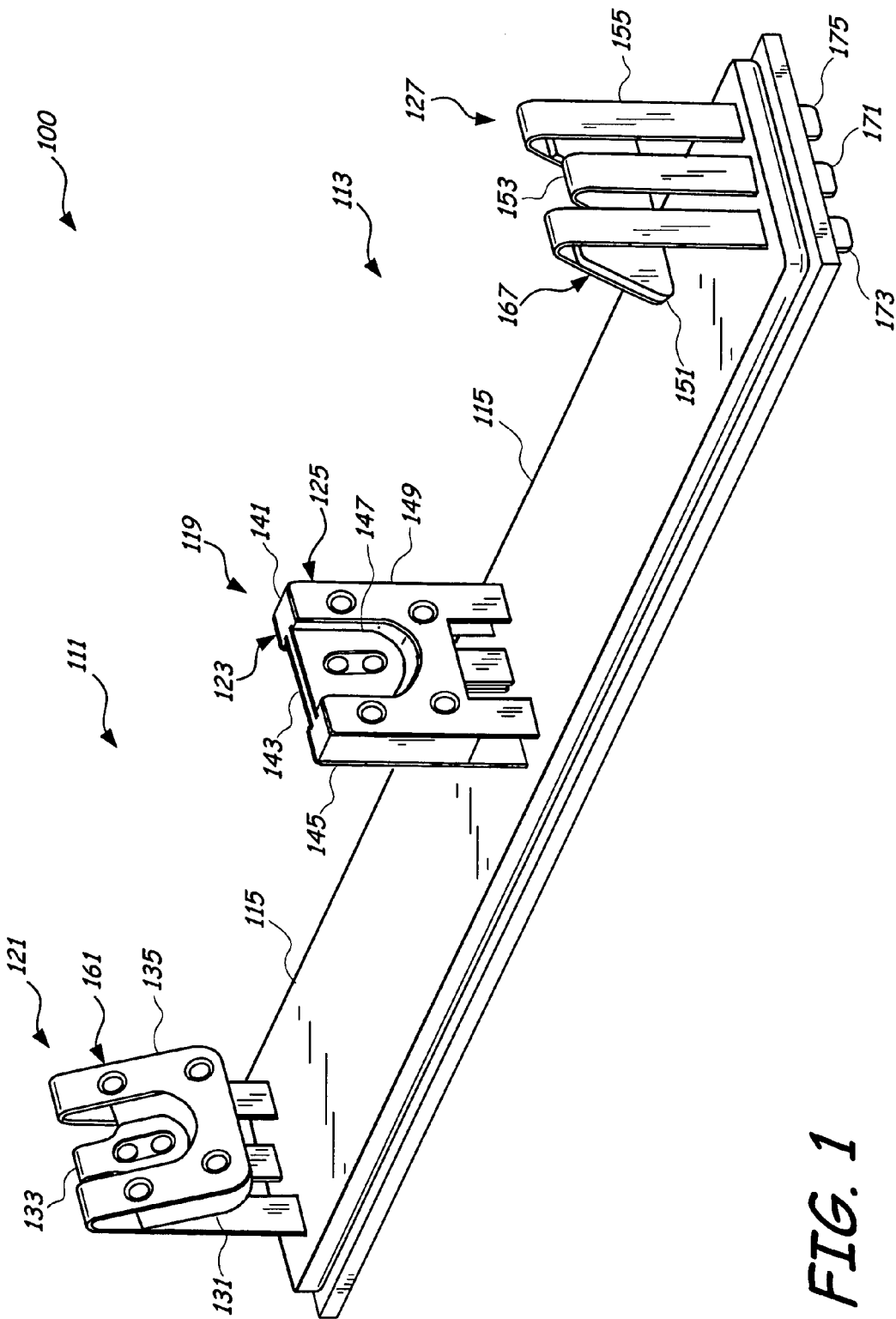
FIG. 1 depicts a perspective view of a multiple battery carriage device, according to an illustrative embodiment.

FIG. 1 depicts a multiple battery carriage 100, according to an illustrative embodiment. Multiple battery carriage 100 is one illustrative embodiment of a device that allows batteries to be placed in any set of orientations in connection with a device and used effectively, as opposed to traditional devices that require each of the batteries to be placed in a certain orientation, and malfunction if this condition is not met. Multiple battery carriage 100 may be included in embodiments such as computing systems, electronic devices, and any apparatus that uses batteries, in various embodiments. The following discussion provides further details of certain illustrative examples of those various embodiments. While certain illustrative multiple battery carriages are included in this and the subsequent figures, they are intended not to indicate any limitations, but rather to indicate illustrative aspects of the variety and broader meaning provided in the discussion and claims herein.

Multiple battery carriage 100 includes first battery carriage 111 and second battery carriage 113. First battery carriage 111 includes substrate 115 and dual-contact assemblies 121 and 123, while second battery carriage 113 includes substrate 115 and dual-contact assemblies 125 and 127. Dual-contact assembly 121 includes insulator 131, positive contact 133, and negative contact 135; dual-contact assembly 123 includes insulator 141, positive contact 143, and negative contact 145. Dual-contact assembly 125 includes insulator 141, positive contact 147, and negative contact 149; and dual-contact assembly 127 includes insulator 151, positive contact 153, and negative contact 155. Dual-contact assemblies 123 and 125 are both comprised together in double-sided dual-contact assembly 119, and share one of their components in common, namely, insulator 141. Double-sided dual-contact assembly 119 is disposed intermediate to the peripheral dual-contact assemblies 121 and 127.

Dual-contact assembly 121 includes spring-loaded dual contact features 133 and 161, and dual-contact assembly 127 includes spring-loaded dual contact features 153 and 167. These spring-loaded dual contact features help ensure that a battery placed in the respective battery carriage will be resiliently and fittingly received between the dual-contact features at either end of the respective battery carriage and maintain continuous contact with the dual-contact features on both sides, in this illustrative embodiment. In other embodiments, the double-sided dual-contact assembly may have spring-loaded dual-contact assemblies on either side thereof, or more than two battery carriages with other combinations and configurations of spring-loaded dual-contact assemblies. Still other embodiments may be configured without any spring-loaded dual-contact assemblies, but may be configured to maintain a secure connection with batteries placed in the battery carriages without spring-loaded dual-contact assemblies.

Positive contacts 133, 143, 147, and 153 are each configured to contact a positive terminal of a battery and to be connected to a positive circuit connection, and negative contacts 135, 145, 149, and 155 are each configured to contact a negative terminal of a battery and to be connected to a negative circuit connection, as is explained in further detail below. For example, as seen for dual-contact assembly 127, positive contact 153 has a tab that passes through substrate 115 so that its end forms contact 171, while two tabs of negative contact 155 pass through substrate 115 as contacts 173 and 175. The other dual-contact assemblies 121, 123, and 125 also have contacts that pass through substrate 115 for each of their positive and negative contacts, although these are obscured from sight in the view of FIG. 1. Substrate 115 may take the form of a printed circuit board (PCB), for example, and may include insertion apertures into which portions of the contacts of the dual-contact assemblies may conductively contact circuit connections of the proper polarities. The circuit connections may be with external connections via the protruding portions of the tabs, or via connections within the substrate, for example.

Figure 2:
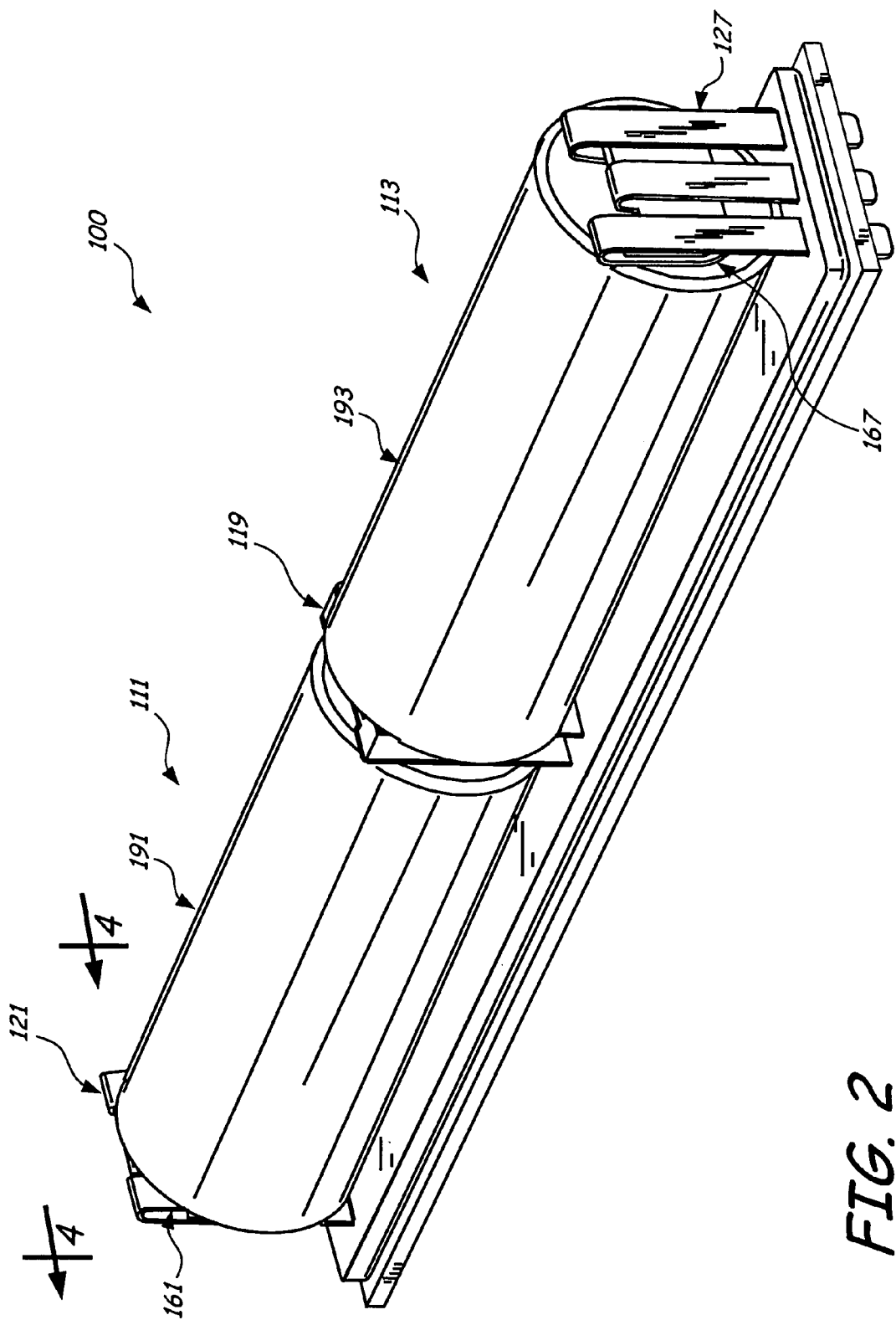
FIG. 2 depicts a perspective view of a multiple battery carriage device with batteries inserted therein, according to an illustrative embodiment.

FIG. 2 depicts multiple battery carriage 100 with batteries 191, 193 placed in battery carriages 111, 113 respectively. Batteries 191, 193 are depicted in the general form of AA or AAA size batteries, though different multiple battery carriage devices may be configured to receive any different sizes and types of batteries, such as C or D size batteries, or batteries with different configurations or morphologies for positive and negative contacts, illustratively such as a standard nine volt battery. In other embodiments, the positive and negative terminals and contacts may also be reversed, for example, while battery carriage devices under these embodiments may also be configured accordingly, with a central, rearwardly positioned contact and a radially outer, annular, forwardly positioned contact that may each be configured as either a positive or negative contact, or in any other arrangement, as needed to conform with the positioning of the terminals of any type of battery in various illustrative embodiments. As can be seen in FIG. 2, the spring-loaded dual contact features 161 and 167 and spring-loaded positive contacts 133 and 153 are reflexively deformed by the imposition of batteries 191 and 193 respectively, such that spring-loaded dual contact features 161 and 167 are pressing against batteries 191 and 193 and help to ensure continuous connections with batteries 191 and 193. Battery 191 is therefore pressed between dual-contact assembly 121 and double-sided dual-contact assembly 119, and battery 193 is pressed between double-sided dual-contact assembly 119 and dual-contact assembly 127. Illustrative advantages of the dual-contact assemblies in drawing the proper charge polarity from the batteries regardless of the batteries' orientation, are depicted more clearly in FIG. 3. FIG. 2 includes lines 4-4 that provide a frame of reference for comparing a cross-sectional view of battery carriage 111 in FIG. 3.

Figure 3:
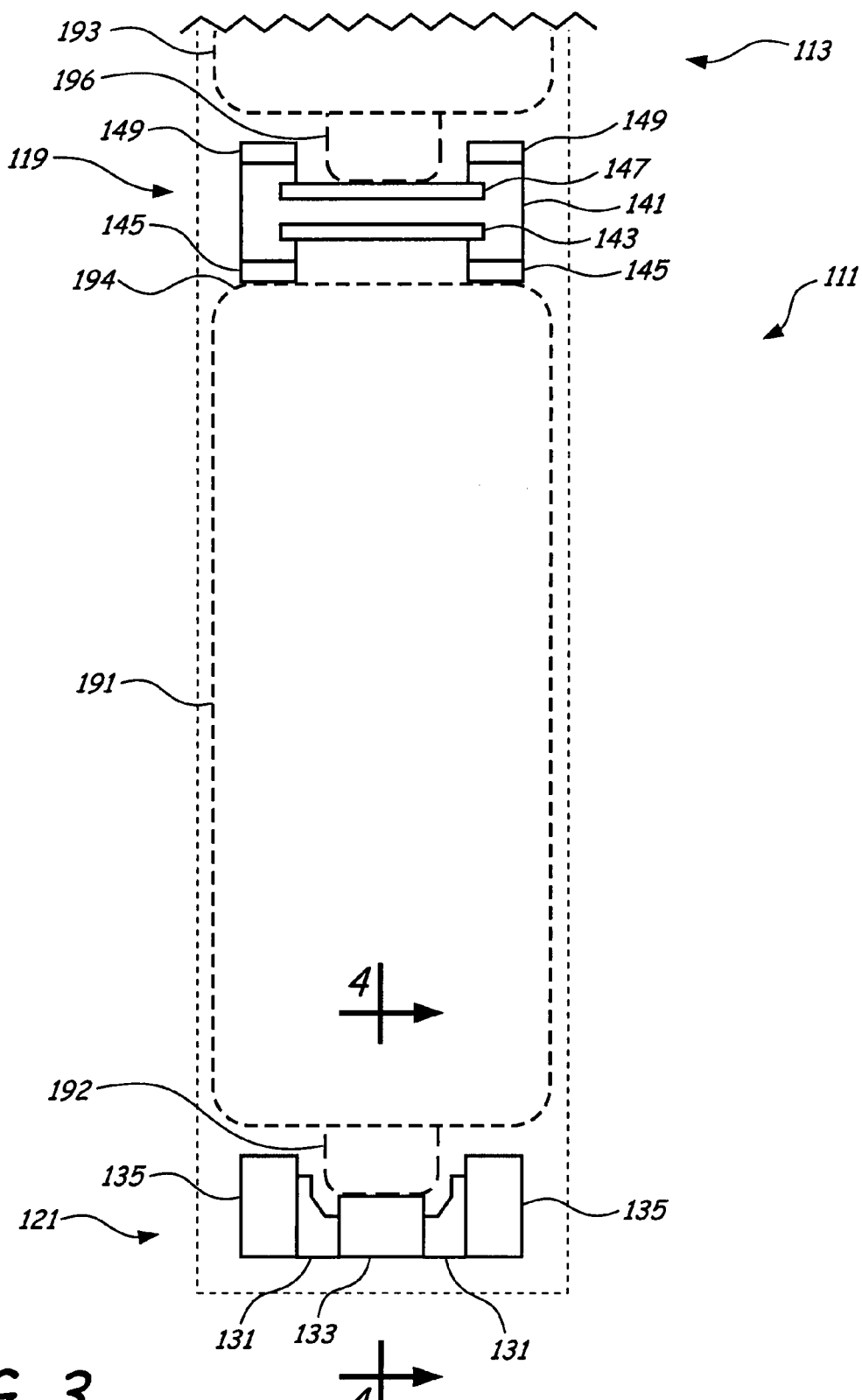
FIG. 3 depicts a top plan view of a detailed portion of a multiple battery carriage device, according to an illustrative embodiment.

FIG. 3 depicts battery carriage 111 in a top-down plan view, which more clearly depicts the interface of the dual-contact assemblies 121 and 123 with the positive and negative contacts of the battery 191. In the depiction of FIG. 3, the battery 191 is oriented in battery carriage 111 with the positive terminal 192 disposed in interface with dual-contact assembly 121, and negative terminal 194 disposed in interface with dual-contact assembly 123, which itself forms a portion of double-sided dual-contact assembly 119; although this orientation is arbitrary, and the reverse orientation would work equally well.

As shown in FIG. 3, the positive contact 133 of dual-contact assembly 121 is in contact with positive terminal 192 of battery 191, due inherently to the radially inward, axially recessed position of positive contact 133 within dual-contact assembly 121. That is, positive contact 133 is both radially inward of negative contact 135, and recessed away from the position of battery 191 relative to negative contact 135 along an axis defined by the centers of the dual-contact assemblies and the batteries, in this illustrative embodiment. Additionally, insulator 131 helps ensure physical separation, including radially and axially, of positive terminal 192 and negative contact 135, in this illustrative embodiment. When battery 191 is placed in battery carriage 111 with the positive terminal aligned in interface with dual-contact assembly 121, positive terminal 192 of battery 191 is thereby caused to contact positive contact 133 and is prevented from contacting negative terminal 135, due to the interface of the protruding shape of positive terminal 192 with dual-contact assembly 121.

Similarly, negative terminal 194 of battery 191 is caused to be in contact with the negative contact 145 of dual-contact assembly 123, and is prevented from contacting positive contact 143 of dual-contact assembly 123, due to the interface of the broader, flat surface of negative terminal 194 with the radially surrounding and axially forwardly disposed position of the generally annular negative contact 145 relative to positive contact 143. That is, negative contact 145 is disposed radially outward of positive contact 143, and is disposed forwardly toward the position of battery 191 relative to positive contact 143 along the axis defined by the centers of the dual-contact assemblies and the batteries, in this illustrative embodiment.

So, while battery 191 is depicted in one particular orientation in FIG. 3, it could just as easily be placed in the reverse orientation in battery carriage 111 and result in the same types of polarity interfaces, with positive and negative terminals of the battery automatically being held in contact with the proper contacts in their interfacing dual-contact assemblies, and automatically prevented from contacting the improper contacts, due inherently to the configuration of the battery carriage. In particular, with reference to the illustrative example of FIG. 3, if battery 191 were placed in the opposite orientation in battery carriage 111, positive terminal 192 of battery 191 would automatically be disposed in contact with positive contact 143 of dual-contact assembly 123 and prevented from contacting negative contact 145 of dual-contact assembly 123, while negative terminal 194 of battery 191 would automatically be disposed in contact with negative contact 135 of dual-contact assembly 121 and prevented from contacting positive contact 133 of dual-contact assembly 121. The same is also true of battery carriage 113, as is indicated with the fragmentary depiction of battery 193 and its positive terminal 196 abutting positive contact 147 of double-sided dual-contact assembly 119. The same may also be applied to additional battery carriages used in other embodiments; the depictions of FIGS. 1-3 are merely illustrative of the broad array of battery carriage devices that could also provide such advantages in a variety of other configurations.

A user may therefore place a battery into each of the battery carriages regardless of orientation, and be assured that the batteries are always connected to the proper contacts, and that the device automatically draws the power it needs safely and effectively.

FIG. 3 also shows the advantage of double-sided dual-contact assembly 119, which is able to provide the inherently proper contact polarization for two batteries, one on either side thereof, while consolidating components and simplifying the configuration relative to having separate dual-contact assemblies. Double-sided dual-contact assembly 119 may have two batteries disposed on either side thereof in any combination of orientations, such that positive battery terminals contact it on either side, two negative battery terminals contact it on either side, or a positive terminal contacts it on one side and a negative terminal contacts it on the other side, and double-sided dual-contact assembly 119 ensures that each of the terminals is automatically connected with the corresponding contacts of the double-sided dual-contact assembly 119 and thereby also to the circuit connections of the proper polarities.

Double-sided dual-contact assembly 119 thereby serves as a polarity-proof battery contact assembly, in that it is proofed against a battery being disposed with an erroneous, potentially damaging polarity relative to the circuit connections of the battery carriages. When a battery is placed between an adjacent pair of the dual-contact assemblies, such as between dual-contact assemblies 121 and 123 or between dual-contact assemblies 125 and 127, the positive terminal of the battery is conductively connected with the positive circuit connection and the negative terminal of the battery is conductively connected with the negative circuit connection, regardless of which way the terminals of the battery are oriented relative to the adjacent pair of dual-contact assemblies.

While the embodiment of FIGS. 1 and 2 depicts a device having two battery carriages in an axially adjacent configuration, these are merely illustrative of a wide variety of additional configurations, which may also include three, four, or any number of battery carriages configured with adjacent pairs of battery carriages, where multiple dual-contact assemblies may be integrated into consolidated dual-contact assemblies at any or all of the interfaces of adjacent dual-contact assemblies comprised in the device. Additionally, while double-sided dual-contact assembly 119 is depicted in FIGS. 1-3 to share insulator 141 in common, other dual-contact assemblies may also realize advantages of consolidation by sharing other components in common or forming other components for various dual-contact assemblies from single components, such as the positive contacts and the negative contacts.

Figure 4:
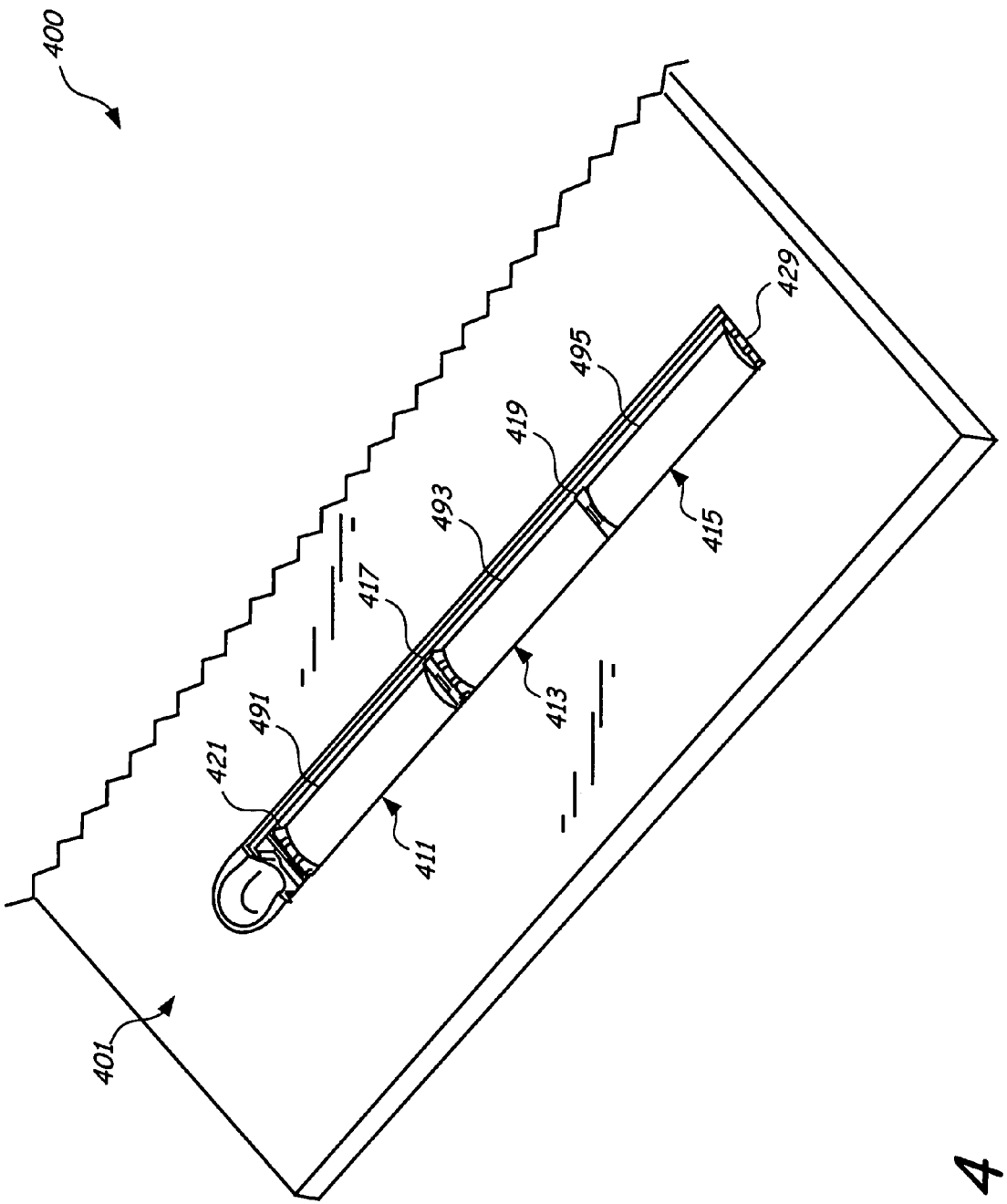
FIG. 4 depicts a perspective view of a multiple battery carriage device, according to another illustrative embodiment.

FIG. 4 depicts the underside of a computer keyboard 400 that includes a multiple battery carriage 401 similar to multiple battery carriage 100 of FIG. 1, although with three battery carriages 411, 413, 415 rather than two, and with two double-sided dual-contact assemblies 417, 419 rather than one, in addition to the dual-contact assemblies 421, 429 at the endpoints of the series of the battery carriages. As is depicted in FIG. 4, double-sided dual-contact assembly 419 has a static dual-contact assembly on one side, and a spring-loaded dual-contact assembly on the opposite side, while double-sided dual-contact assembly 417 has static dual-contact assemblies on both sides. Together with the spring-loaded contact dual-contact assemblies 421, 429 at the endpoints of the series, this ensures that each of the batteries is in contact with one spring-loaded dual-contact assembly, which helps ensure that each of the batteries remains in a resiliently grasping fit, and therefore that the terminals remain reliably in contact with the contact surfaces. Computer keyboard 400 is one illustrative example of a powered device that may advantageously make use, of a multiple battery carriage. A wide variety of other devices, including any battery-powered device, may also benefit from a multiple battery carriage device as described herein, and the particular example of computer keyboard 400 does not imply any limitations on the variety of other embodiments. Batteries 491, 493, 495 are depicted placed in battery carriages 411, 413, 415. Any number of battery carriages may be included in a grouping of multiple battery carriages in other embodiments, and each interface between two adjacent battery carriages may include combined dual-contact interfaces that provide advantages relative to having separate solitary dual-contact interfaces in each of the two battery carriages. Computer keyboard 400 is provided as an illustrative embodiment of an exemplary device that may comprise and benefit from multiple battery carriages with dual-contact assemblies, though this is only one example from a great variety of devices that may benefit from groupings of multiple battery carriages with dual-contact assemblies, which may include any electrical device.

Figure 5:
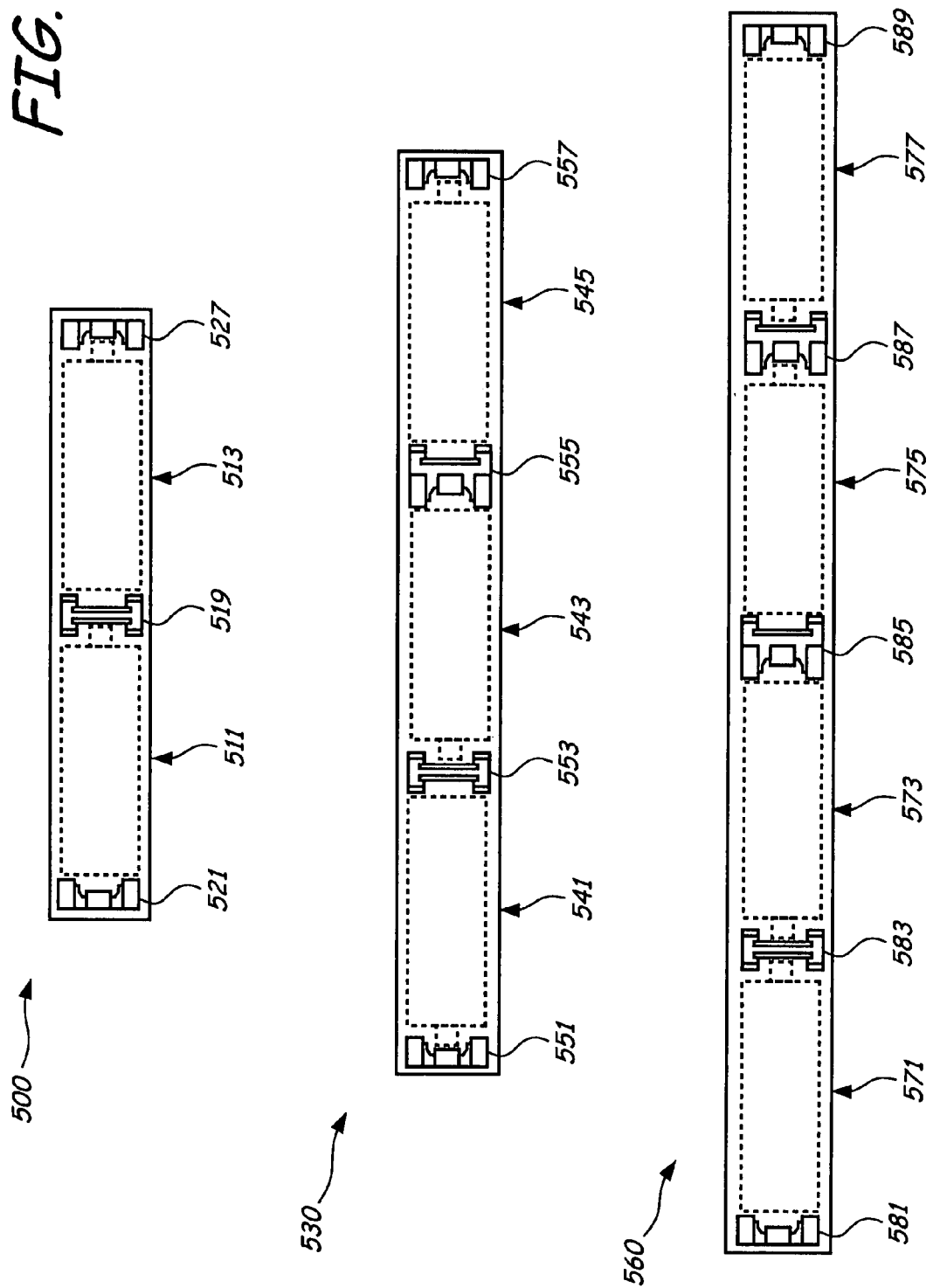
FIG. 5 depicts top plan schematics of several multiple battery carriage devices, according to a number of illustrative embodiments.

FIG. 5 depicts simplified diagrams of several illustrative configurations of multiple battery carriage devices, with different arrangements of dual-contact assemblies, some spring-loaded and others static (i.e. springless or non-spring-loaded). Battery carriage device 500 corresponds to the configuration of FIGS. 1-3, where dual-contact devices 521 and 527 are spring-loaded single-sided dual-contact assemblies, and the interface between battery carriage 511 and 513 comprises a springless double-sided dual-contact contact assembly 519. Battery carriage device 530 includes a series of three battery carriages 541, 543, 545, with spring-loaded single-sided dual-contact assemblies 551, 557 at the peripheries of the series of battery carriages; static double-sided dual-contact assembly 553 between the first and second battery carriages 541, 543; and double-sided dual-contact assembly 555 with one spring-loaded side and one static side, between second and third battery carriages 543, 545. In other embodiments, double static-sided assembly 553 and single static-sided, single spring-loaded sided assembly 555 could be exchanged in position, or additional static sides could be replaced with spring-loaded sides where that helps ensure reliable battery positioning, or other variations in configuration may be included, in various different embodiments.

Battery carriage device 560 includes a series of four battery carriages 571, 573, 575, 577, with spring-loaded single-sided dual-contact assemblies 581, 589 at the peripheries of the series of battery carriages; static double-sided dual-contact assembly 583 between the first and second battery carriages 571, 573; and double-sided dual-contact assemblies 585, 587 between second and third battery carriages 573, 575 and between the third and fourth battery carriages 575, 577, where dual-contact assemblies 585, 587 each have a single spring-loaded side and a single static side. As seen, the batteries are placed in various orientations in all the different battery carriages in FIG. 5, with each terminal of each battery connected to the contact with the proper polarity, positive or negative, on the adjacent dual-contact assembly; and the batteries would remain in proper polarity in any other set of orientations. Again, a variety of other configurations may also occur in other embodiments, in which the positioning of the assemblies may be rearranged, additional static assemblies may be replaced by spring-loaded assemblies or vice versa as consistent with desired battery positioning, and variations of other kinds may be made.

Each of battery carriage devices 500, 530, 560 thereby ensures a resiliently secure connection for batteries placed in each of the battery carriages of each of the devices. Battery carriage devices 500, 530, and 560 illustrate a few of the various configurations that may be composed using different types of dual-contact assemblies as disclosed herein. Other devices that include any of a wide variety of other configurations of dual-contact assemblies are encompassed within the present disclosure that are encompassed within the embodiments that may be extrapolated with different combinations of dual-contact assemblies such as those depicted in FIG. 5, in any combination and with any number or arrangement of battery carriages.

Figure 6:
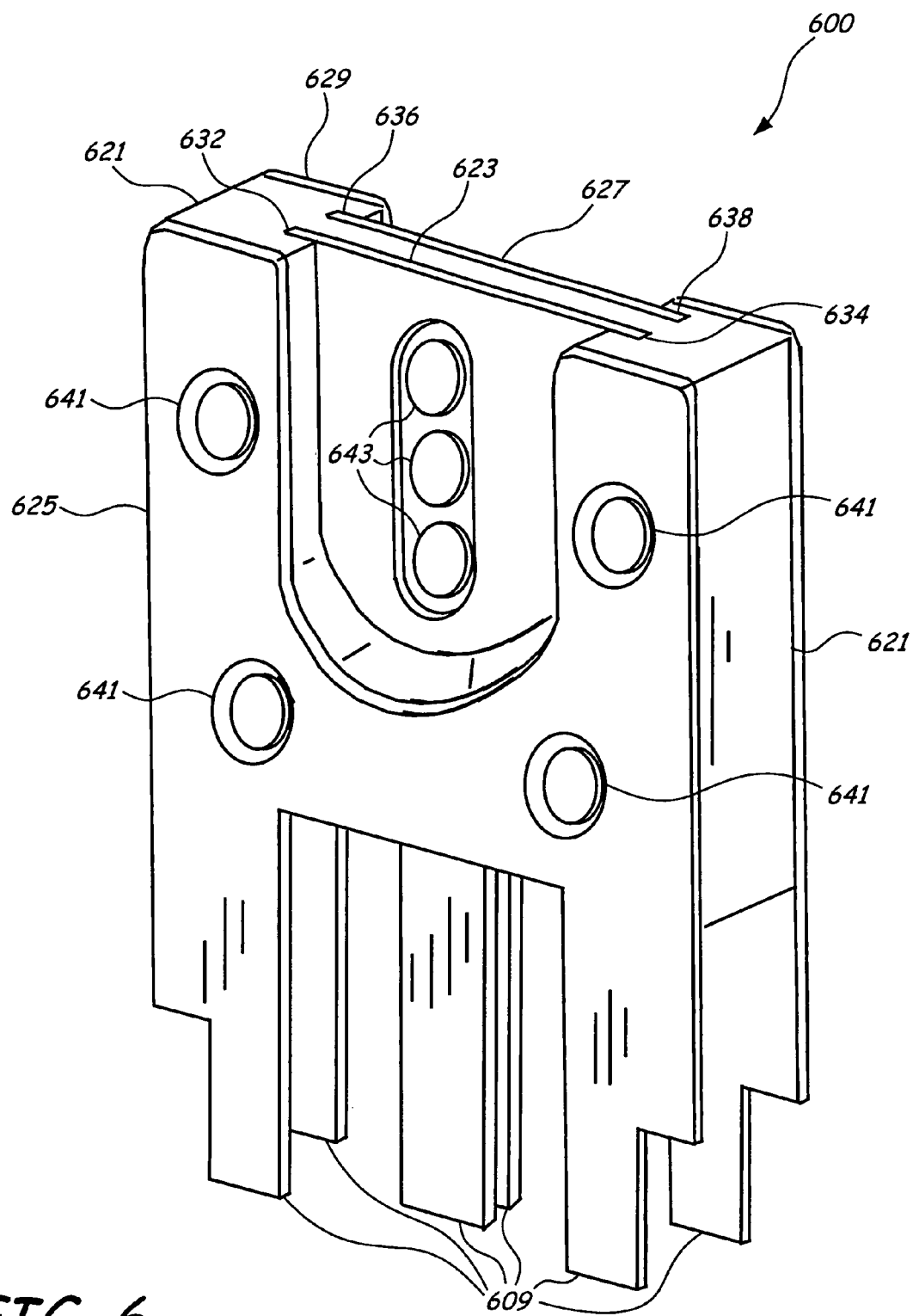
FIG. 6 depicts a perspective view of a double-sided dual-contact assembly, according to an illustrative embodiment.

FIG. 6 provides a clearer depiction of a springless double-sided dual-contact assembly 600 similar to springless double-sided dual-contact assemblies 119, 519, 553, and 583 of the previous figures. Similar to those dual-contact assemblies, dual-contact assembly 600 includes insulator 621, positive contacts 623 and 627, and negative contacts 625 and 629.

FIG. 6 facilitates the depiction of details of the springless double-sided dual-contact assembly, such as notched or stoppered tabs 609, which may be implanted into slots in a substrate such as substrate 115 of FIG. 1 to a self-limiting depth controlled by the positions of the notch steps on the tabs 609. A narrower section defined below each of the notch steps is configured to engagingly penetrate a mounting aperture in the substrate, while a wider stopper section is defined above the notch steps and is configured to limit the depth of penetration of the tab. The tabs connected with each of positive contacts 623, 627 are configured to be connected to the positive circuit connection, and at least one of the tabs connected with each of negative contacts 625, 629 is configured to be connected to the negative circuit connection.

These stoppered tabs therefore help provide for the dual-contact assembly 600 to be positioned at the proper height relative to the substrate. In other illustrative embodiments, any number of stoppered tabs or analogous mechanisms may be included. This may include only a single stoppered tab per dual-contact assembly in one embodiment, or more than are depicted in FIG. 6, as consistent with reliably maintaining the positioning of the dual-contact assemblies. Ensuring the proper height of the assemblies may also be provided by other types of mechanisms, such as formed L-shaped bends in the metal contacts, extensions of the plastic insulators, additional spacer parts, or other mechanisms or combinations of the those described above.

Additional detailed features include embedded wings 632, 634 of positive contact 623 and embedded wings 636, 638 of positive contact 627. These positive contacts are wider than the exposed area that is available to contact a battery terminal, with the peripheries thereof forming wings that are embedded in insulator 621. These embedded wings help ensure that positive contacts 623, 627 durably maintain their proper position within dual-contact assembly 600.

Additional features that serve to ensure the structural stability of dual-contact assembly 600 are plastic stakes 641 that anchor the negative contact 625 against insulator 621, and plastic stakes 643 that anchor the positive contact 623 against insulator 621, along with corresponding plastic stakes, obscured from view in FIG. 6, that anchor negative contact 629 and positive contact 627 against insulator 621.

Insulator 621 may be composed of an injection molded plastic or other electrically insulative material, and the conducting components then joined to it, for example, in this illustrative embodiment. Each of the contacts 623, 625, 627, and 629 may be formed with apertures at the positions where the plastic stakes are depicted, where the injection molded plastic of the insulator 621 may project through the apertures. Each of the projections of plastic may then be heated and compressed against the contacts, so that they are radially expanded and compressed around the annulus of their respective apertures, and set into the form depicted in FIG. 6, in which each of the plastic stakes tightly anchors its respective contact against insulator 621. A wide variety of other features and manufacturing processes, including but not limited to ultrasonic welding, metal insert injection molding, adhesives, and so forth, may also be used to integrate the structural elements of various dual-contact assemblies, under a wide variety of embodiments of which the embodiment of FIG. 6 is merely illustrative.

Figure 7:
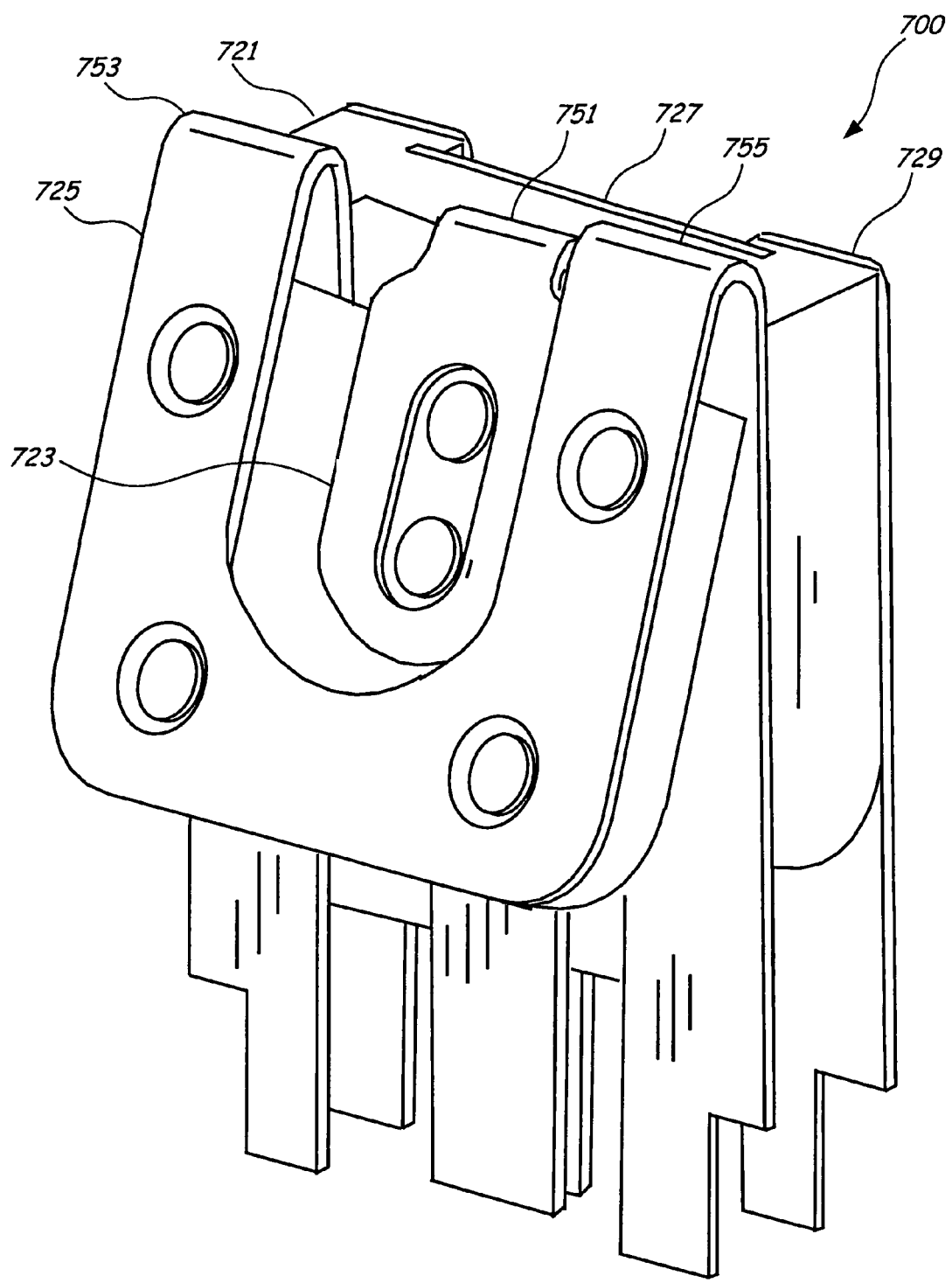
FIG. 7 depicts a perspective view of a double-sided dual-contact assembly, according to another illustrative embodiment.

Similar features are also shown in FIG. 7, which depicts double-sided dual-contact assembly 700 that has spring-loaded contacts on one side, for positive contact 723 and negative contact 725, and springless contacts on the other side, for positive contact 727 and negative contact 729. In particular, positive contact 723 is connected to insulator 721 via spring-loaded joint 751, and negative contact 725 is connected to insulator 721 via spring-loaded joints 753, 755. Double-sided dual-contact assembly 700 also features plastic stakes and notched tabs similar to those of double-sided dual-contact assembly 600 of FIG. 6. Other embodiments may also occur, such as with spring-loaded dual-contact assemblies on both sides of assembly 700 rather than one spring-loaded side and one static side as depicted in FIG. 6, for example. Any or all of the double-sided dual-contact assemblies in a battery carriage device, such as those depicted in FIG. 5, may be provided in the form shown in FIG. 7 as another illustrative example.

Figure 8:
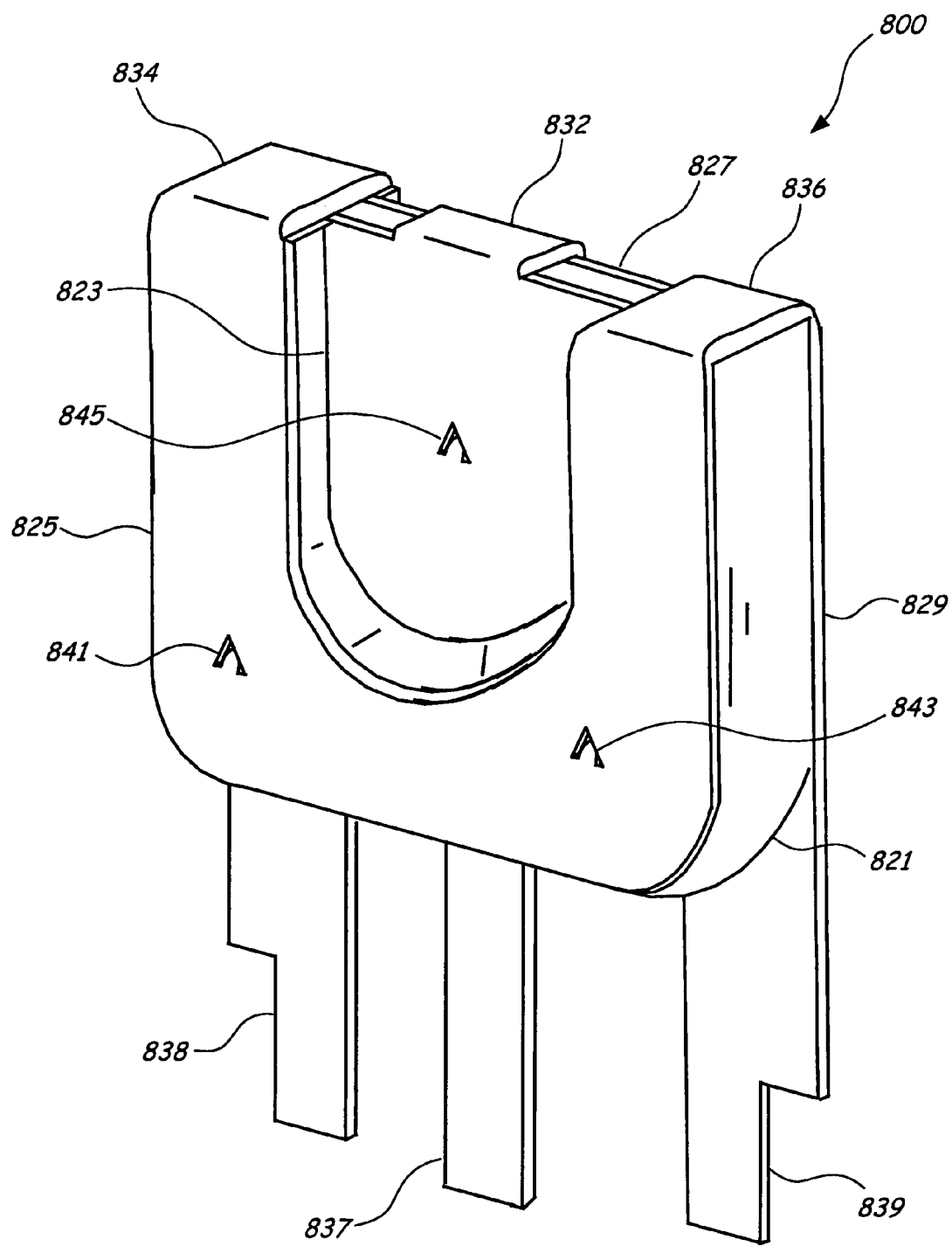
FIG. 8 depicts a perspective view of a double-sided dual-contact assembly, according to another illustrative embodiment.

FIG. 8 provides yet another illustrative example of a double-sided dual-contact assembly 800 that may be used, in any combination with other components, in a battery carriage device. Double-sided dual-contact assembly 800 provides additional advantages that are best seen in light of a background relative to the potential for series and parallel battery connections.

In different battery carriage devices, it may be desirable to have the circuit connections of the battery carriages connected in series or in parallel. In typical end-to-end multiple battery carriages, the circuit connections are arranged in series, to go along with the constraint that each of the batteries must be inserted in the proper orientation so that the proper polarity of connections will be conductively connected to the circuit connections. These arrangements also do not include parallel circuit connections.

Different embodiments disclosed herein may automatically ensure proper series or parallel connections of the batteries in each of the multiple battery carriages, regardless of the orientation of each of the batteries, because of the dual-contact assembly at the positions of each of the battery terminals. As those skilled in the art will easily appreciate, a parallel connection with the battery carriages may be automatically ensured by providing conductive connections of the positive contacts in each of the dual-contact assemblies with a common positive connection, and providing conductive connections of the negative contacts in each of the dual-contact assemblies with a common negative connection; while a series connection with the battery carriages may be automatically ensured by providing chained connections of the positive contacts in each of the dual-contact assemblies, and chained connections of the negative contacts in each of the dual-contact assemblies.

Additionally, if the battery carriage device is designed for parallel connection, then the positive contacts on either side of a double-sided dual-contact assembly may be connected in the substrate, and the negative contacts on either side of the double-sided dual-contact assembly may be connected in the substrate. However, since they would be connected anyway in the vicinity of the double-sided dual-contact assembly, the contacts from both sides of the double-sided assembly may be combined in the assembly itself, with their corresponding contacts on the opposing sides of the assembly. This is depicted in FIG. 8, according to one illustrative embodiment.

In FIG. 8, positive contacts 823, 827 are connected together as sections of a single, integral component via connecting bridge 832 that spans the top of double-sided dual-contact assembly 800, while negative contacts 825, 829 are also connected together as sections of a single, integral component via connecting bridges 834, 836 that span the top of double-sided dual-contact assembly 800. In other embodiments, only a single one of connecting bridges 834, 836 may be included, since only one is necessary to provide electrical conductivity between negative contacts 825, 829, as one among many potential examples of different configurations available in different embodiments. For the combined positive contact component, only one single notched tab 837 is needed to conductively interface with a positive circuit connection, and the two notched tabs 838, 839 conductively interface with a negative circuit connection. In another illustrative embodiment, only a single notched tab may be used to conductively interface with the negative circuit connection, for example. Configurations such as these may save material and weight in the double-sided dual-contact assembly 800 as well as free up space adjacent to it on one side, and potentially reduce the required manipulation of the substrate and the circuit connections due to the simpler design and freed-up space.

Another illustrative feature is depicted in FIG. 8 as another example of how the contacts of a dual-contact assembly may be reliably secured together with the internal insulator 821, by using retention barbs 841, 843 on negative contact 825 and retention barb 845 on positive contact 823, as well as a similar arrangement on the opposite face of dual-contact assembly 800. A potentially analogous configuration may be used in any other dual-contact assemblies that may be incorporated in a battery carriage device, in addition to still other embodiments. Retention barbs 841, 843, 845 may be formed by cutting chevron forms in the contacts and pressing the chevron forms inward, to bite into insulator 821, thereby providing another mechanism for the contacts 823, 825, 827, 829 to remain securely fastened together with insulator 821. The chevron forms of the retention barbs as depicted are only one illustrative configuration, and barbs and other fastening mechanisms are not limited to the depicted example in other embodiments, but may take any of a broad variety of forms that serve to fasten the components together.

Figure 9:
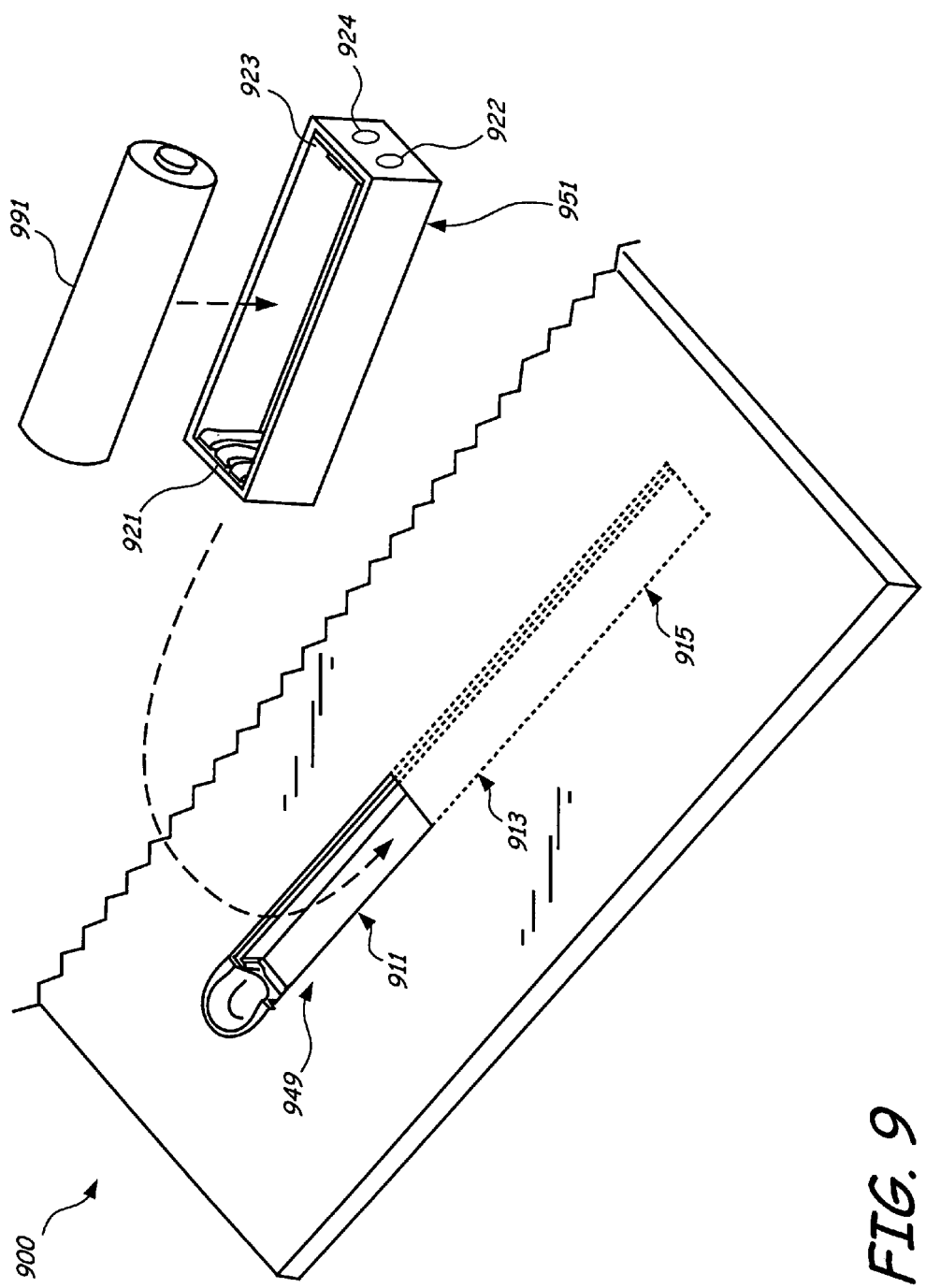
FIG. 9 depicts a perspective view of a multiple battery carriage device, according to another illustrative embodiment.

FIG. 9 depicts a device 900 that has a partially enclosed slot 949 in it, much of which is covered over, and the interior of which is accessible through the relatively smaller opening in the slot. Device 900 still includes battery carriages 911, 913, 915, while some of them are enclosed within the covered portion of the slot 949, as depicted in dotted lines in FIG. 9.

Device 900 also includes several battery carriages in the form of cartridge 951 that are configured to be capable of passage, one at a time, into slot 949 through the opening of the slot, as shown. Each cartridge 951 includes dual-contact assemblies 921, 923 at either end thereof, so that a battery may be placed in any orientation within each cartridge 951, while once again maintaining polarity-proof external electrical contacts to be provided to a circuit connection of the device 900. Dual-contact assembly 921 is depicted as being spring-loaded while dual-contact assembly 923 is depicted as being static, to help ensure that a battery positioned between them is resiliently grasped and remains firmly positioned in place, while in other embodiments, reliable battery positioning may be achieved with static assemblies on both sides, spring-loaded assemblies on both sides, or combinations of these options with other mechanisms for maintaining battery positioning, in various embodiments.

The slot 949 includes positive and negative battery connections (not depicted in FIG. 9) configured to interface with external positive and negative electric contacts 922, 924 respectively, on the exterior of cartridge 951, along with corresponding contacts on the reverse side of cartridge 951. Each of several batteries such as battery 991 may be inserted first into a cartridge 951, and then cartridge 951 inserted into slot 949 and slid back into place under the covering of the slot, until the proper number of cartridges have been inserted to fill the length of slot 949, while that proper number may be any number depending on the configuration of a particular embodiment. The cartridges 951 may be configured to conformingly and separably engage in the slot 949, such that when the cartridges 951 are conformingly engaged in the slot 949, the cartridges 951 are connected to the positive and negative circuit connections of the slot 949 and thereby of the device 900.

This forms yet another illustrative embodiment that may yield a number of additional advantages. For example, the cartridges and covered slot may provide greater assurance that the batteries will stay in place and in maintenance of a secure electrical connection even if the device 900 is jostled or dropped or otherwise subjected to forces and shocks that, in a traditional device, might otherwise break the circuit connection of the batteries or dislodge the batteries from their proper positions, particularly in a traditional device in which the batteries are all held in place with a cover panel that could be simultaneously impacted by the force of all the batteries at once if the device is subjected to a shock impact.

As another illustrative advantage of device 900, the electrical contacts on either end of each of the cartridges may be connected together with the opposite contact of like polarity within the slot, in addition to fixed conductive connections at the endpoints of the slot. Because of this, any number of the cartridges may be filled with batteries and any number may be left empty, and the cartridges will still form a complete circuit within the slot once they are all inserted into place, that is able to deliver power to the host device from whatever cartridges happen to contain batteries. Then, for example, if a user did not have enough charged batteries to fill all the cartridges, and even if the user has only a single charged battery, the user may still put the limited number or the one single charged battery into the cartridges, insert the full and empty cartridges together in the slot, in any order and any orientations, and the circuit will be complete, and power will be provided sufficient to power the device 900.

In yet other illustrative embodiments, batteries may be provided that are securely encased within cartridges similar to cartridge 951, or batteries may be manufactured to have a form factor analogous to that of cartridge 951, so that the cartridge is integrally configured as a battery and is ready-made for use in a device with a slot-defined series of battery carriages such as in device 900. This would provide further advantages of freeing the user from having to perform the sequence of steps of first placing one or more batteries into a cartridge, and then placing the cartridges in place in the slot. This embodiment may also enable the interior space of each of the cartridges to be more efficiently used to house the internal materials of a battery, so that a greater amount of energy and a longer battery life can be packed into the same volume within the cartridge.

Although the subject matter herein has been described in language specific to certain illustrative structural features, it is to be understood that the subject matter defined in the appended claims is not necessarily limited to any of the specific features or acts described above. Rather, the specific features and acts described above are disclosed as example forms of implementing the claims. As a particular example, while many embodiments are presented with illustrative elements that are widely familiar at the time of filing the patent application, it is envisioned that many new innovations in technology will affect elements of different embodiments, and that the elements defined by the claims may be embodied according to these and other innovative advances while still remaining consistent with and encompassed by the elements defined by the claims herein.

What is claimed is:

1. A device comprising:
   a component with a slot therein, the slot comprising positive and negative contacts for positive and negative circuit connections; and
   a battery cartridge removably insertable into the slot and including external positive and negative contacts on an exterior of the battery cartridge, the external positive and negative contacts being electrically coupleable to the positive and negative contacts in the slot upon insertion of the battery cartridge into the slot, wherein the battery cartridge comprises:
   an internal compartment configured to removably receive at least one battery; and
   first and second dual-contact assemblies positioned at ends of the internal compartment, each of the first and second dual-contact assemblies comprising:
   a positive contact configured to contact a positive terminal of a battery and to be electrically coupled to the positive circuit connection, and
   a negative contact configured to contact a negative terminal of a battery and to be electrically coupled to the negative circuit connection.

2. The device of claim 1, wherein the slot is partially enclosed and is accessible through an opening that is smaller than the slot, wherein the battery cartridge is configured to be passed through the opening.

3. The device of claim 1, the battery cartridge comprising a joint cartridge that comprises a plurality of battery carriages, each of the battery carriages comprising first and second dual-contact assemblies.

4. The device of claim 1, and further comprising:
   a second battery cartridge configured to removably receive at least one battery, the battery cartridge being removably insertable into the slot and electrically couplable to the positive and negative circuit connections of the slot, wherein the second battery cartridge comprises:
   first and second dual-contact assemblies, each of which includes:
   a positive contact configured to contact a positive terminal of a battery and to be electrically coupled to the positive circuit connection, and
   a negative contact configured to contact a negative terminal of a battery and to be electrically coupled to the negative circuit connection.

* * * * *